United States Patent [19]

Cook, Jr.

[11] 4,362,261
[45] Dec. 7, 1982

[54] CLAMP ASSEMBLY FOR A FRICTION WELDING MACHINE

[75] Inventor: Francis W. Cook, Jr., Newington, Conn.

[73] Assignee: Litton Industrial Products, Inc., New Britain, Conn.

[21] Appl. No.: 188,057

[22] Filed: Sep. 17, 1980

[51] Int. Cl.³ .......................... B23K 20/12; B23Q 3/06
[52] U.S. Cl. ............................................ 228/2; 269/34
[58] Field of Search .............................. 228/2; 269/34

[56] References Cited

FOREIGN PATENT DOCUMENTS

| 246520 | 4/1966 | Austria ................................. 269/34 |
| 2065835 | 4/1976 | Fed. Rep. of Germany .......... 228/2 |
| 1257813 | 2/1961 | France .................................. 269/34 |
| 55-144947 | 11/1980 | Japan ................................... 269/34 |

*Primary Examiner*—Kenneth J. Ramsey
*Attorney, Agent, or Firm*—Spencer T. Smith

[57] ABSTRACT

A friction welding machine comprising a clamp assembly for securing a workpiece against rotation including a pair of opposed chuck means for supporting the pair of chuck means for relative horizontal slidable displacement means for controlling the displacement of the pair of opposed chucks so that the pair of chucks will be conjointly and equally displaced means for displacing the pair of chuck means having first and second vertically oriented arms each pivotally secured at a medial location to the supporting means, first and second link means each connected at one end to one of the chuck means for limited pivotal displacement relative thereto, and at the other end pivotally connected to the top of the corresponding arm, and hydraulic cylinder means extending between and pivotally mounted on the bottom of the arms, and a base for supporting the supporting means, the base having opening means for receiving the hydraulic cylinder means.

2 Claims, 2 Drawing Figures

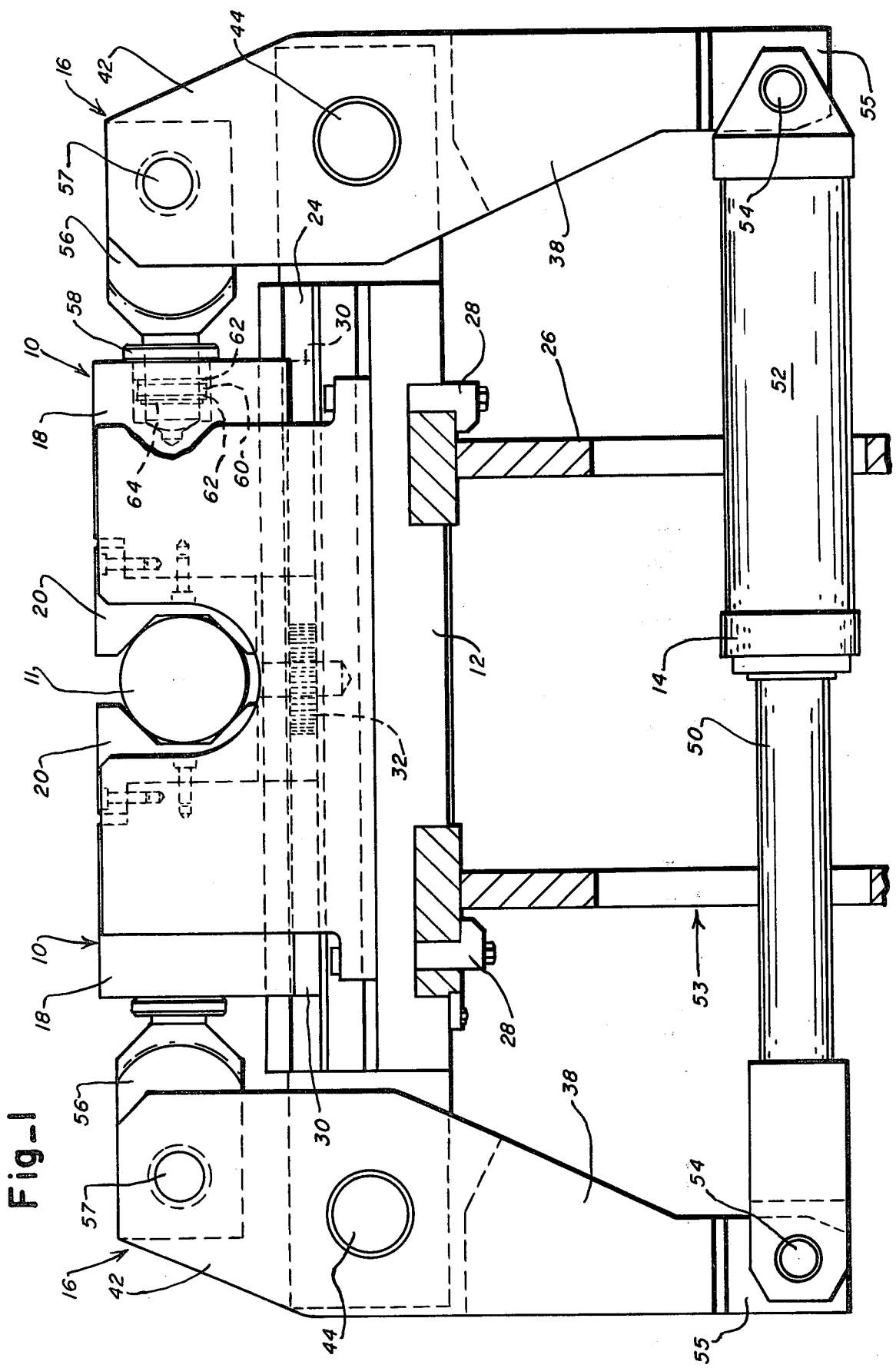
Fig_1

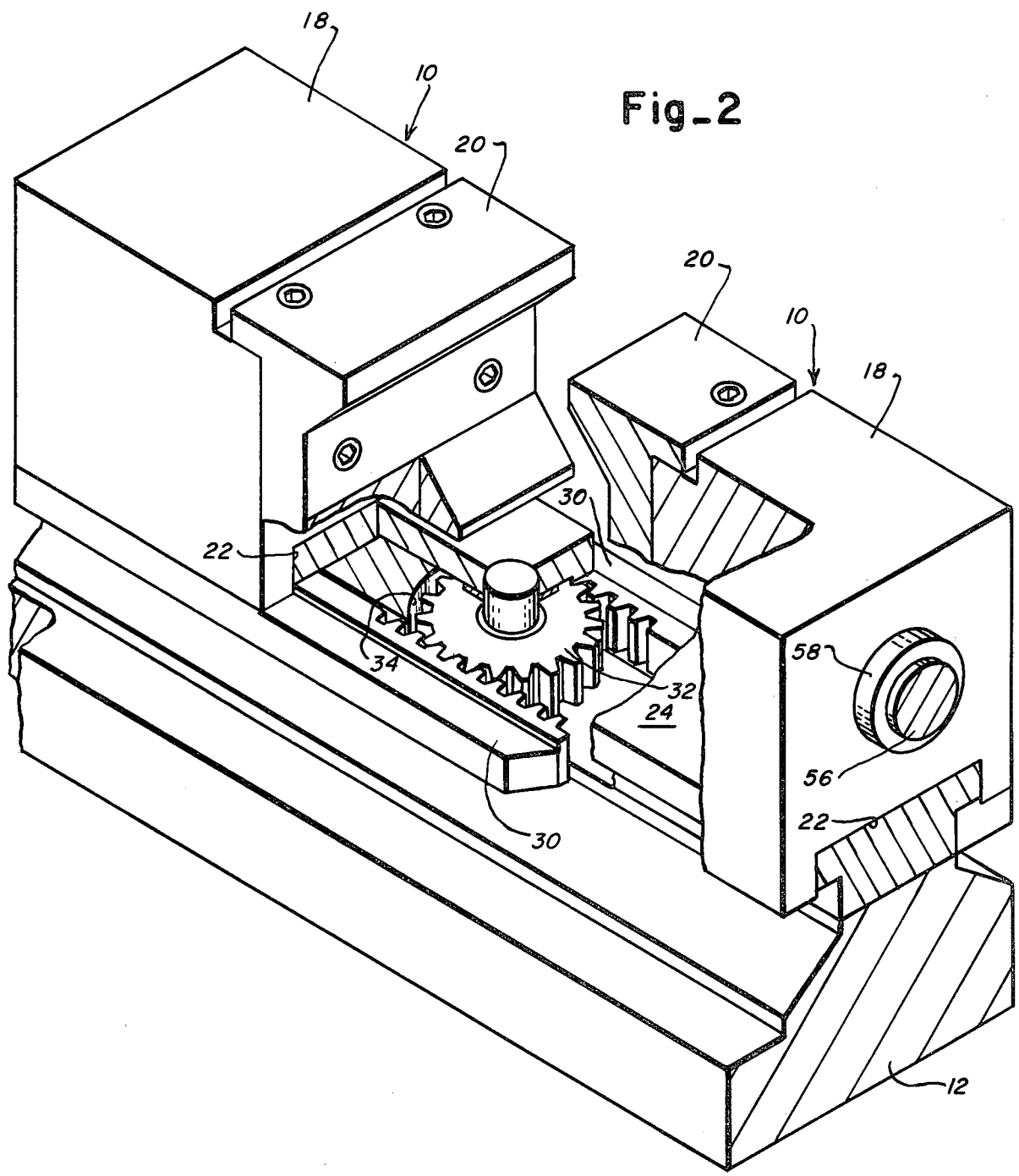
Fig_2

CLAMP ASSEMBLY FOR A FRICTION WELDING MACHINE

A friction welding machine frictionally welds together axially related workpieces. One of these workpieces is clamped or secured against rotatin and a second workpiece is secured to a work spindle which is rotatively driven and axially advanced to achieve the desired weld.

This invention relates to an assembly for clamping the workpiece which is to be secured against rotation in a friction welding machine.

Conventionally, workpieces have been clamped by direct acting opposed hydraulic cylinders. Such assemblies introduce large bending moments into the machine base which tend to displace the clamped workpiece from the spindle centerline.

It is an object of the present invention to provide a friction welding machine having a clamp assembly which will subject the machine base only to tensional forces, thereby improving its accuracy.

Other objects and advantages of the present invention will become apparent from the following portion of the specification and from the accompanying drawings which illustrate, in accordance with the mandate of the patent statutes, a presently preferred embodiment incorporating the principles of the invention.

Referring to the drawings:

FIG. 1 is an elevational view partly in section of a friction welding machine at the location of the clamping assembly for clamping a workpiece against rotation according to the teachings of the present invention; and FIG. 2 is a perspective view in partial section of a portion of the clamping assembly illustrated in FIG. 1.

The clamping assembly includes opposing chucks 10 for clamping a workpiece 11. The chucks 10 are supported for horizontal displacement on a slide member 12 and are displaceable by a hydraulic cylinder 14 through opposing linkage assemblies 16. Each chuck includes a housing 18 to which a workpiece engaging jaw 20 is secured. Suitable way surfaces 22 are established in the base of each housing for slidably engaging way surfaces on a slide plate 24 of the slide member which is secured to the base 26 of a friction welding machine by conventional clamps 28. A gear rack 30 is secured to each chuck housing 18 and operatively engages with a pinion gear 32. The pinion is located within a cutout 34 in the slide plate 24 and is pivotally secured between the top portion of the slide plate and the slide member base. The chucks 10 will, accordingly, be self-centering.

The single hydraulic cylinder 14 acts conjointly on both chucks 10 through the opposing linkage assemblies 16, each of which includes a lever arm 38. Each lever arm 38 has an upper bifurcated portion 42 and is pivotally mounted on shafts 44 to the slide member. The hydraulic cylinder 14, which has a piston rod 50 and a housing 52, passes through an opening 53 in the machine base and is pivotally secured by pins 54 to the lower ends 55 of the lever arms 38. Each linkage assembly 16 also has a knuckle member 56 which is joined at one end by a conventional flex joint to a chuck for limited relative pivotal movement and is pivotally joined by pins 57 at the other end to the top end 42 of the associated lever arm 38. The flex joint includes a nut member 58 threadedly secured to the jaw member 18 which retains a rubber spacer 60 sandwiched between two metallic spacers 62 maintained on the knuckle 56 by a snap ring 64.

What is claimed is:

1. A friction welding machine clamp assembly for securing a workpiece against rotation comprising
   a pair of opposed chuck means,
   means for supporting said pair of chuck means for relative slidable horizontal displacement,
   said supporting means being a single element uninterrupted structure capable of having applied thereto a pure tension horizontally acting load,
   means for controlling the displacement of said pair of opposed chucks so that said pair of chucks will be conjointly and equally displaced,
   means for displacing said pair of chuck means having
   first and second vertically oriented arms each pivotally secured at a medial location to said single element uninterrupted structure supporting means,
   first and second link means each connected at one end to one of said chuck means for limited pivotal displacement relative thereto and at the other end pivotally connected to the top of said corresponding arm, and
   hydraulic cylinder means extending horizontally between and pivotally mounted on the bottom of said arms, whereby balanced compressive loads are applied through both ends of said arms by means of said hydraulic cylinder means putting said supporting means into a pure tension load thereby preventing said supporting means from bending and
   a base for supporting said supporting means, said base having opening means for receiving said hydraulic cylinder means.

2. A friction welding machine clamp assembly according to claim 1, wherein said controlling means comprises
   pinion means mounted on said supporting means, and
   rack means secured to each of said chuck means for operative engagement with said pinion.

* * * * *